UNITED STATES PATENT OFFICE.

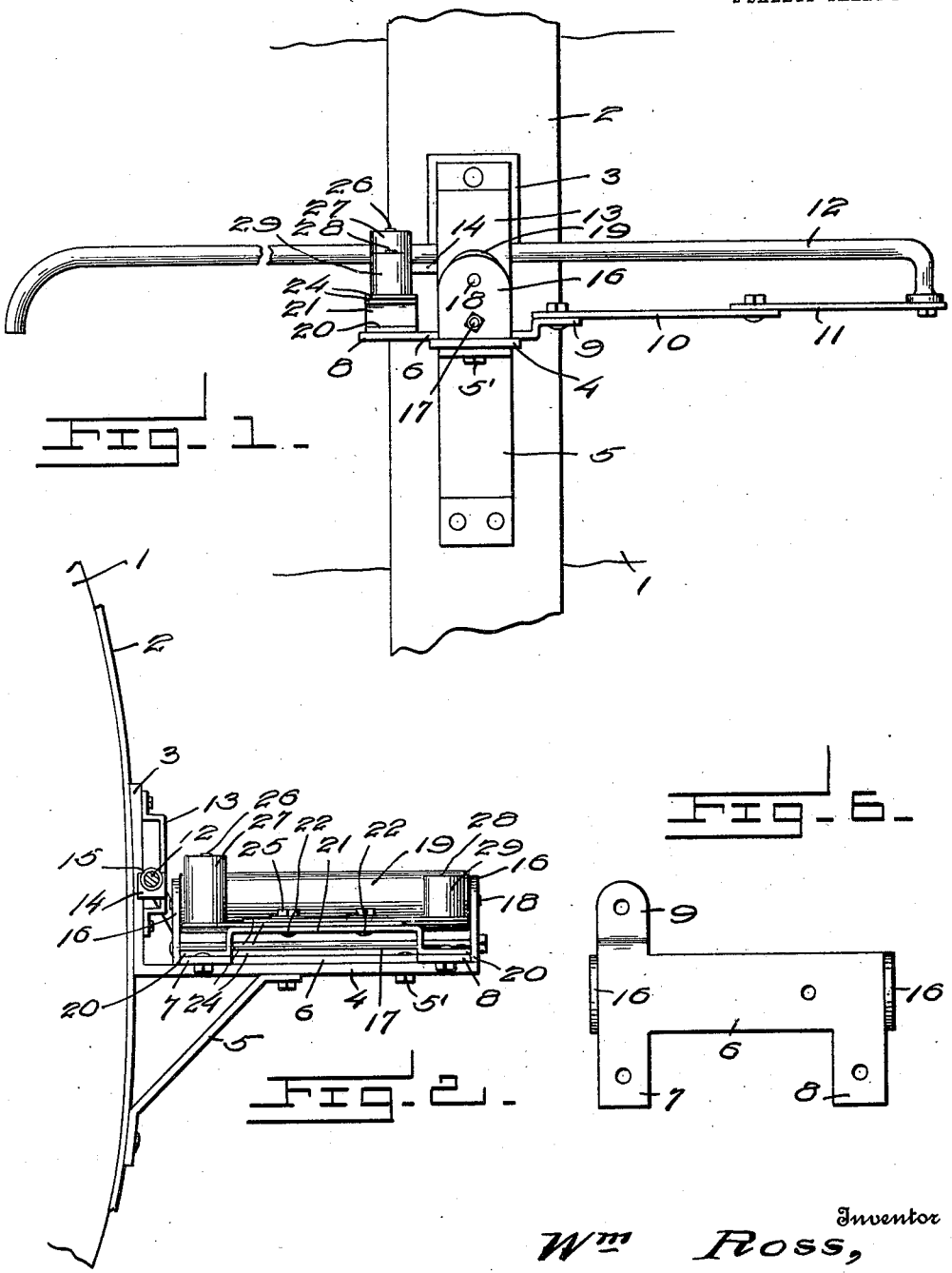

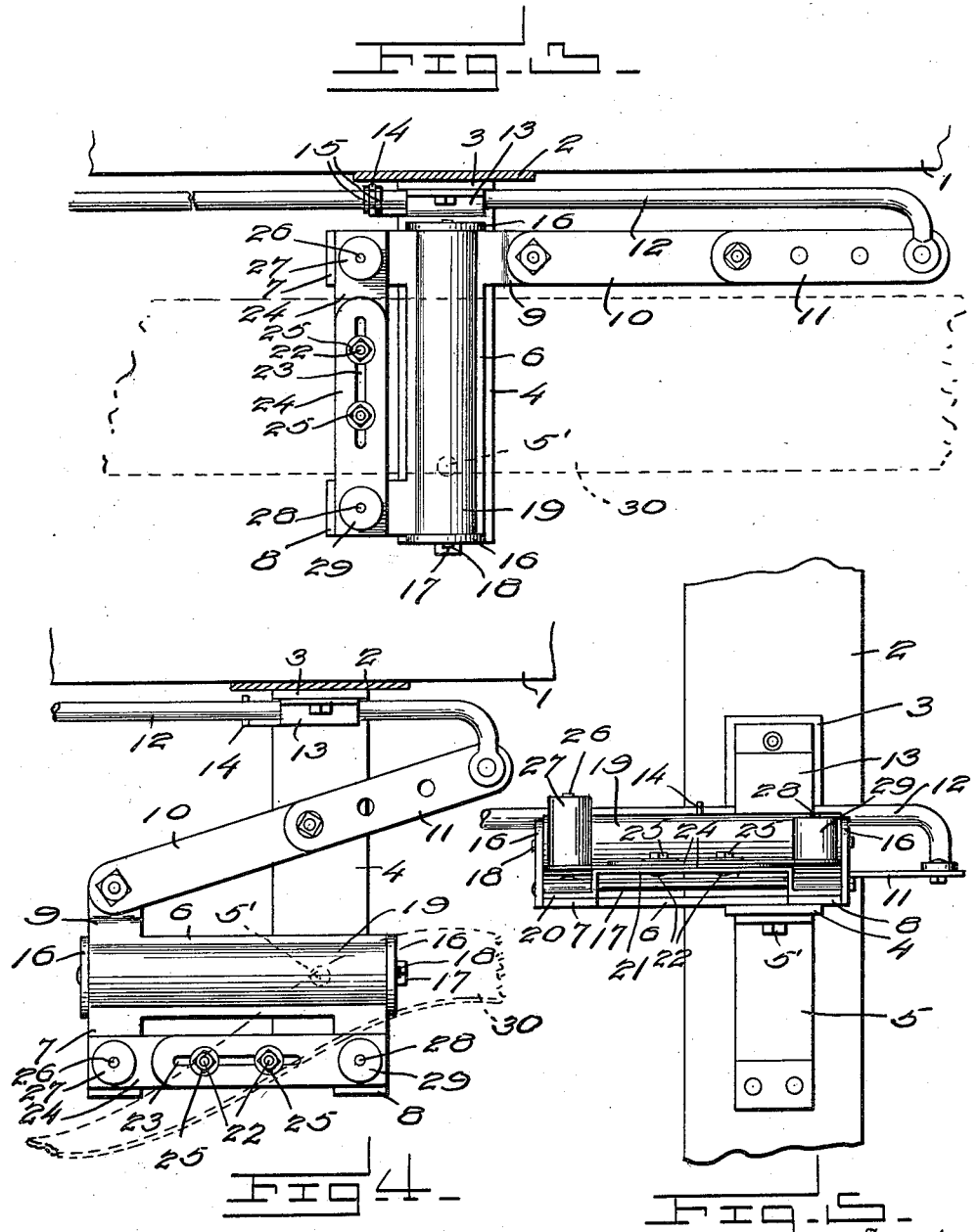

WILLIAM ROSS, OF GARSKE, NORTH DAKOTA.

BELT-SHIFTER.

1,013,065.　　　　　Specification of Letters Patent.　　Patented Dec. 26, 1911.

Application filed May 4, 1911.　Serial No. 624,967.

*To all whom it may concern:*

Be it known that I, WILLIAM ROSS, a citizen of the United States, residing at Garske, in the county of Ramsey and State of North Dakota, have invented certain new and useful Improvements in Belt-Shifters, of which the following is a specification.

My invention relates to improvements in belt shifters, and has for its leading object the provision of an improved belt shifter which may be readily secured to the boiler of a traction engine and which will serve to satisfactorily shift the belt thereof.

A further object of the invention is the provision of an improved belt shifter which will normally be out of engagement with the belt to eliminate wearing of the edges of the belt against the shifting roller, but which when moved to shift the belt will engage the belt to both satisfactorily throw the same and prevent the belt from flying off and becoming entangled with the machinery of the engine.

Other objects and advantages of my invention will be apparent from the following description taken in connection with the drawings, and it will be understood that I may make any modifications in the construction shown and described within the scope of the claims and without departing from or exceeding the spirit of the invention.

Figure 1 represents a side elevation of a boiler equipped with my belt adjuster. Fig. 2 represents a front view of the adjuster. Fig. 3 represents a top plan view thereof with the belt passing thereover. Fig. 4 represents a similar view showing the adjuster moved to throw off the belt. Fig. 5 represents a side elevation of Fig. 4, and Fig. 6 represents a plan view of the supporting plate of the adjuster.

In the drawings, the numeral 1 designates the boiler having passing therearound the clamping band 2 to which is secured the arm 3 of the plate 4 braced by the brace plate 5 which is secured to the band and to the plate 4.

Pivoted to the outer end of the plate 4 by the bolt 5′ is the plate 6 having the pair of forwardly projecting arms 7 and 8 and the rearwardly projecting arm 9 to which is pivoted the link 10 adapted to be adjustably secured to the plate 11 carried by the end of the adjusting rod 12 which passes forward through the guide bracket 13 secured to the arm 3 of the plate 4, a clevis member 14 being formed integral with the bracket 13 to engage the collars 15 on the lever 12 to limit the movement of said lever. The plate 6 has the upturned end flanges 16 connected by the brace bolt 17, while journaled in said flanges 16 are the ends of the spindle 18 bearing the horizontally disposed roller 19.

Secured to the forwardly extending arms 7 and 8 is a bracket plate 20 having the offset portions 21 to hold its central portions spaced above said arm, and projecting upward from the central portion of the plate 20 are the bolts 22 which are engaged in the slots 23 of the plates 24, nuts 25 engaged on the upper ends of the bolts 22 serving to clamp said plates 24 against sliding movement on the bolts as guides. Rising from the plate 24 above the arm 7 of the base plate is the spindle 26 on which is rotatably mounted the guide or shifting roller 27 which extends upward a distance above the top of the roller 19, while rising from the outer end of the other plate 24 is the spindle 28 of less height than the top of the roller 19 and bearing the roller 29.

In operation, my adjustment is normally so disposed that the roller 27 will be adjacent the inner edge of the belt 30 but out of engagement therewith, said belt passing above and out of engagement with the roller 19. When it is desired to throw the belt, I raise the lever 12 until its collars 15 are above the clevis 14 and then draw forward on the lever, the lever through the links 10 and 11 shifting the plate 6 on the pivot 5′ the roller 27 engaging the inner edge of the belt 30 and forcing it outward off of its pulley, while as the belt is thrown from the pulley it will drop down upon the roller 19 and its further outward movement will be prevented by the roller 29 which will then engage its outer edge, as clearly shown in Figs. 4 and 5.

From the foregoing description taken in connection with the drawings, the construction and operation of my improved belt shifter will be readily understood, and it will be seen that I have provided an improved efficient belt shifter which is normally out of the road of said belt and does not engage the belt but which when moved to throw the belt will engage the belt on the under side and outer side or edge as well as at the inner edge to serve as a guide for the belt when the same is shifted.

It will also be observed that the rollers 27 and 29 may be adjusted with respect to each other according to the width of belt in connection with which they are used.

I claim:

1. A belt shifter, comprising a flexible attaching band, a plate projecting radially therefrom, a supporting plate pivoted to the other plate near the outer ends of the plates, a rearwardly projecting arm formed on the latter plate, a shifting rod, a link connecting said rod with the arm of the plate to swing the latter on its pivot, said plate having upturned end flanges, a spindle journaled in said end flanges, a roller mounted on the spindle, a pair of arms projecting forward from the said plate, a bracket connecting said arms, plates slidably adjustable on said bracket, an upstanding spindle carried by each of the plates, a roller journaled on one of said spindles and projecting above the top of the roller carried by the plate, and a roller mounted on the spindle of the other adjustable plate and of less height than the top of the roller of the supporting plate.

2. A belt shifter, comprising a stationary member, a plate pivotally secured thereto, a transverse roller rotatably mounted on the plate a pair of vertical rollers supported by the plate in advance of the transverse roller, one of said vertical rollers projecting above the transverse roller and the other being of less height than said roller, and means for swinging the plate and rollers supported thereby on its pivot, whereby the longer roller will shift the belt to drop down upon the transverse roller as a support and into engagement with the shorter vertical roller as a guide.

3. A belt shifter, comprising a stationary member, a plate pivoted to the outer end of said member, said plate having a rearwardly extending and a pair of forwardly extending arms, said plate being further formed with upturned end flanges, a transverse roller, a spindle therefor having its ends journaled in the upturned flanges, vertical shifting and guiding rollers carried by the forwardly extending arms, a link pivoted to the rearwardly extending arm, a lever secured to the link and extending forwardly therefrom, said lever having spaced collars secured thereon, and a guide member for the lever secured to the stationary member of the adjuster and having an integrally formed clevis to engage the lever between the collars to prevent movement thereof.

In testimony whereof I affix my signature, in the presence of two witnesses.

WILLIAM ROSS.

Witnesses:
HOMER RESLER,
F. C. TOUDAR.

Copies of this patent may be obtained for five cents each, by addressing the "Commissioner of Patents, Washington, D. C."